(12) United States Patent
Marchese et al.

(10) Patent No.: US 11,014,785 B1
(45) Date of Patent: May 25, 2021

(54) BUILDING SHUTTLE BOX DELIVERY SYSTEM

(71) Applicants: Julien Marchese, New York, NY (US); Frank Marchese, New York, NY (US)

(72) Inventors: Julien Marchese, New York, NY (US); Frank Marchese, New York, NY (US)

( * ) Notice: Subject to any disclaimer, the term of this patent is extended or adjusted under 35 U.S.C. 154(b) by 0 days.

(21) Appl. No.: 16/774,801

(22) Filed: Jan. 28, 2020

(51) Int. Cl.
| | |
|---|---|
| B66B 11/02 | (2006.01) |
| B66B 9/00 | (2006.01) |
| B66B 9/02 | (2006.01) |
| B66B 11/00 | (2006.01) |
| B66B 13/30 | (2006.01) |
| B66B 5/28 | (2006.01) |
| B66B 11/04 | (2006.01) |
| B66B 7/02 | (2006.01) |
| B66B 7/04 | (2006.01) |
| B66B 13/00 | (2006.01) |
| B61B 13/10 | (2006.01) |
| B61B 13/00 | (2006.01) |
| B60L 13/04 | (2006.01) |

(52) U.S. Cl.
CPC .......... *B66B 11/0206* (2013.01); *B60L 13/04* (2013.01); *B61B 13/00* (2013.01); *B61B 13/10* (2013.01); *B66B 5/28* (2013.01); *B66B 7/02* (2013.01); *B66B 7/046* (2013.01); *B66B 9/003* (2013.01); *B66B 9/02* (2013.01); *B66B 11/005* (2013.01); *B66B 11/0407* (2013.01); *B66B 13/00* (2013.01); *B66B 13/303* (2013.01); *B66B 2201/303* (2013.01)

(58) Field of Classification Search
CPC .. B66B 11/0206; B66B 11/0407; B60L 13/04; B61B 13/00; B61B 13/10
See application file for complete search history.

(56) References Cited

U.S. PATENT DOCUMENTS

| | | | | |
|---|---|---|---|---|
| 3,265,326 A * | 8/1966 | Mach | ..................... | B65G 51/24 |
| | | | | 406/182 |
| 3,490,717 A * | 1/1970 | Rejler | ..................... | B65G 51/04 |
| | | | | 406/77 |
| 4,941,777 A * | 7/1990 | Kieronski | ................ | B65G 1/06 |
| | | | | 406/110 |
| 6,474,912 B1 * | 11/2002 | Meeks | ................... | B65G 51/26 |
| | | | | 406/13 |
| 6,729,808 B1 * | 5/2004 | Nelson | ................... | B65G 51/18 |
| | | | | 406/11 |
| 7,104,734 B2 * | 9/2006 | Smith | ................... | B65G 51/04 |
| | | | | 406/117 |
| 7,341,406 B1 * | 3/2008 | Gromley | ................ | B65G 51/20 |
| | | | | 406/197 |
| 10,501,205 B1 * | 12/2019 | Siewert | ..................... | B64F 1/32 |

(Continued)

*Primary Examiner* — Jason C Smith
(74) *Attorney, Agent, or Firm* — Richard Eldredge; Leavitt Eldredge Law Firm

(57) ABSTRACT

A building shuttle box delivery system includes a plurality of delivery ducts connected in a delivery network. The system further includes a plurality of delivery vehicles configured to travel along the delivery ducts and are accessible via a plurality of access ports distributed along the delivery network. The system may further include hold devices, movement rails, positional pads, directional pads, crawler wheel assemblies and fall brakes disposed on the delivery ducts and delivery vehicles to facilitate travel throughout the delivery network.

4 Claims, 3 Drawing Sheets

(56) References Cited

U.S. PATENT DOCUMENTS

| | | | | |
|---|---|---|---|---|
| 2008/0298906 A1* | 12/2008 | Scott | ............... | B65G 51/34 406/12 |
| 2014/0338557 A1* | 11/2014 | Zhou | ............... | B61B 13/08 104/138.1 |
| 2015/0158599 A1* | 6/2015 | Sisko | ............... | B64F 1/20 244/114 R |
| 2021/0038005 A1* | 2/2021 | Morris | ............ | A47G 29/30 |

* cited by examiner

BUILDING SHUTTLE BOX DELIVERY SYSTEM

BACKGROUND

1. Field of the Invention

The present invention relates generally to freight delivery systems, and more specifically, to a building shuttle box delivery system for transporting freight both vertically and horizontally throughout a building.

2. Description of Related Art

Freight delivery systems are well known in the art and are effective means to transport goods from one location to another. For example, elevators are compartments suspended on cables within a shaft of a building or other structure. The compartment is used to load people or cargo on at one part of the building and move them vertically along the shaft. However, one limitation to freight delivery systems, such as elevators, is the limited ability to transport cargo within a building other than along the vertical shafts that are commonly used. While attempts at transitioning cabled compartments to horizontal shafts have been attempted the use of the cables lowers the efficiency if not the practicality of the arrangement.

Accordingly, although great strides have been made in the area of freight delivery systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
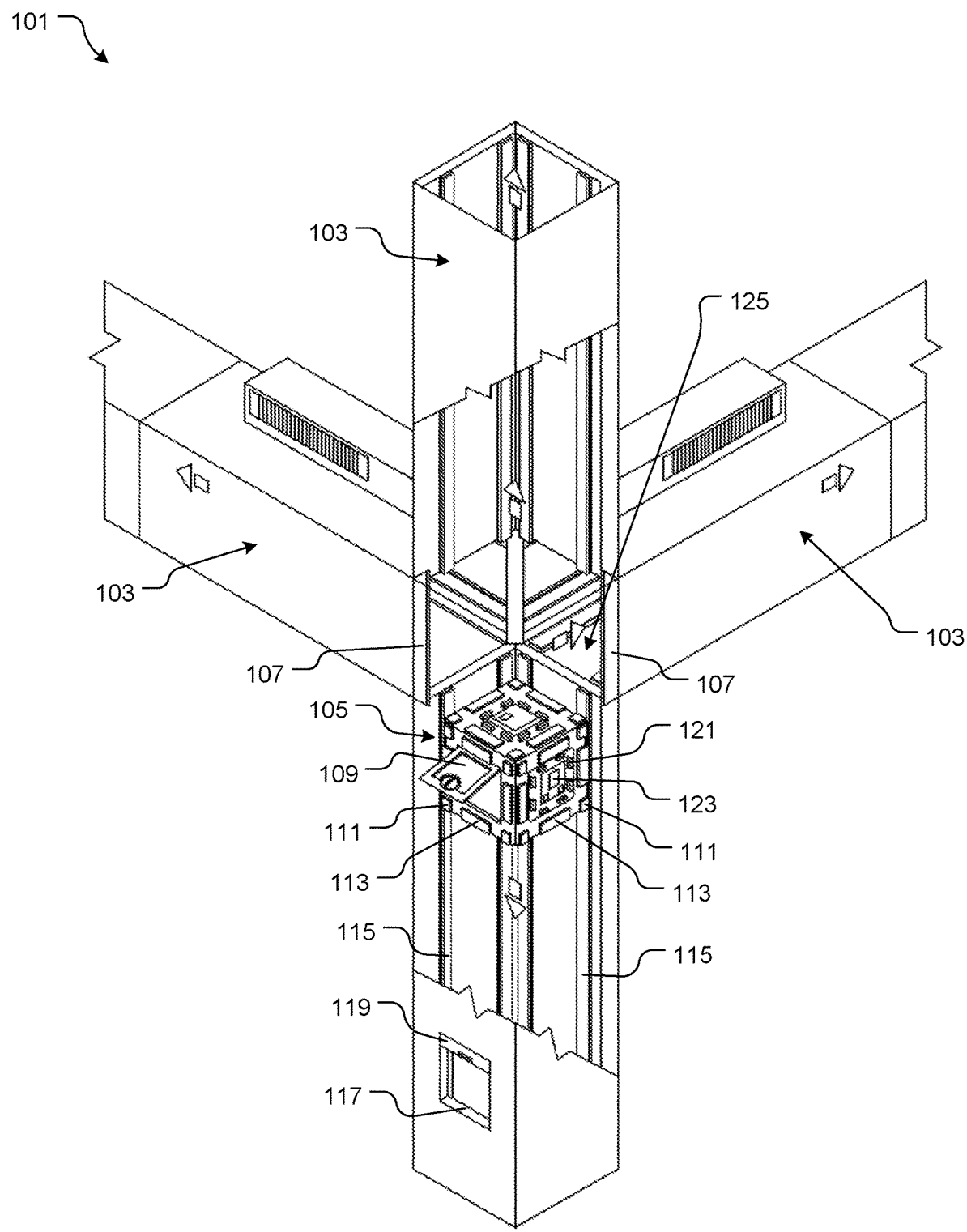
FIG. 1 is a perspective view of a building shuttle box delivery system in accordance with a preferred embodiment of the present application.
Figure 2:
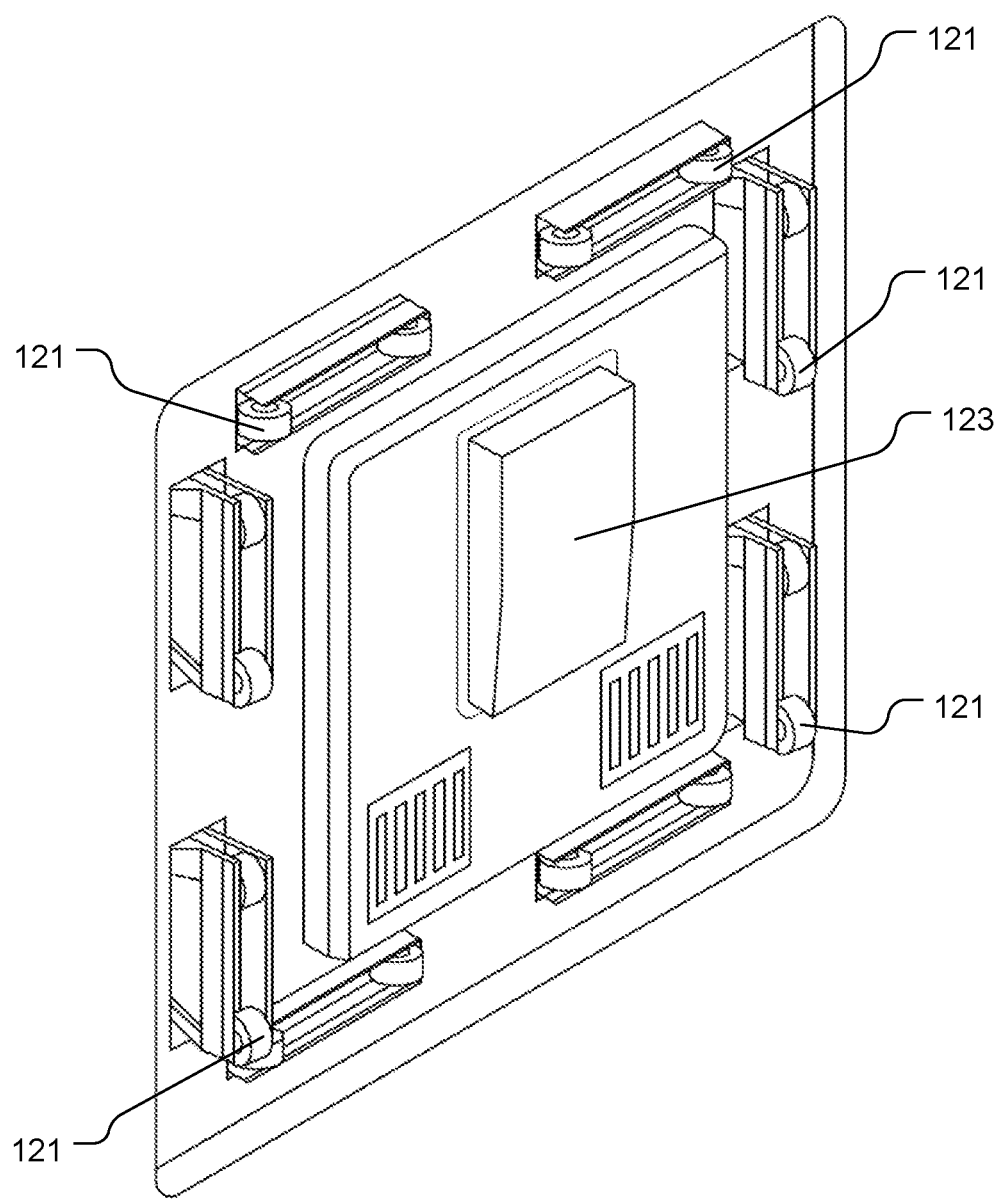
FIG. 2 is a perspective view of a side of a delivery vehicle in the building shuttle box delivery system.
Figure 3:
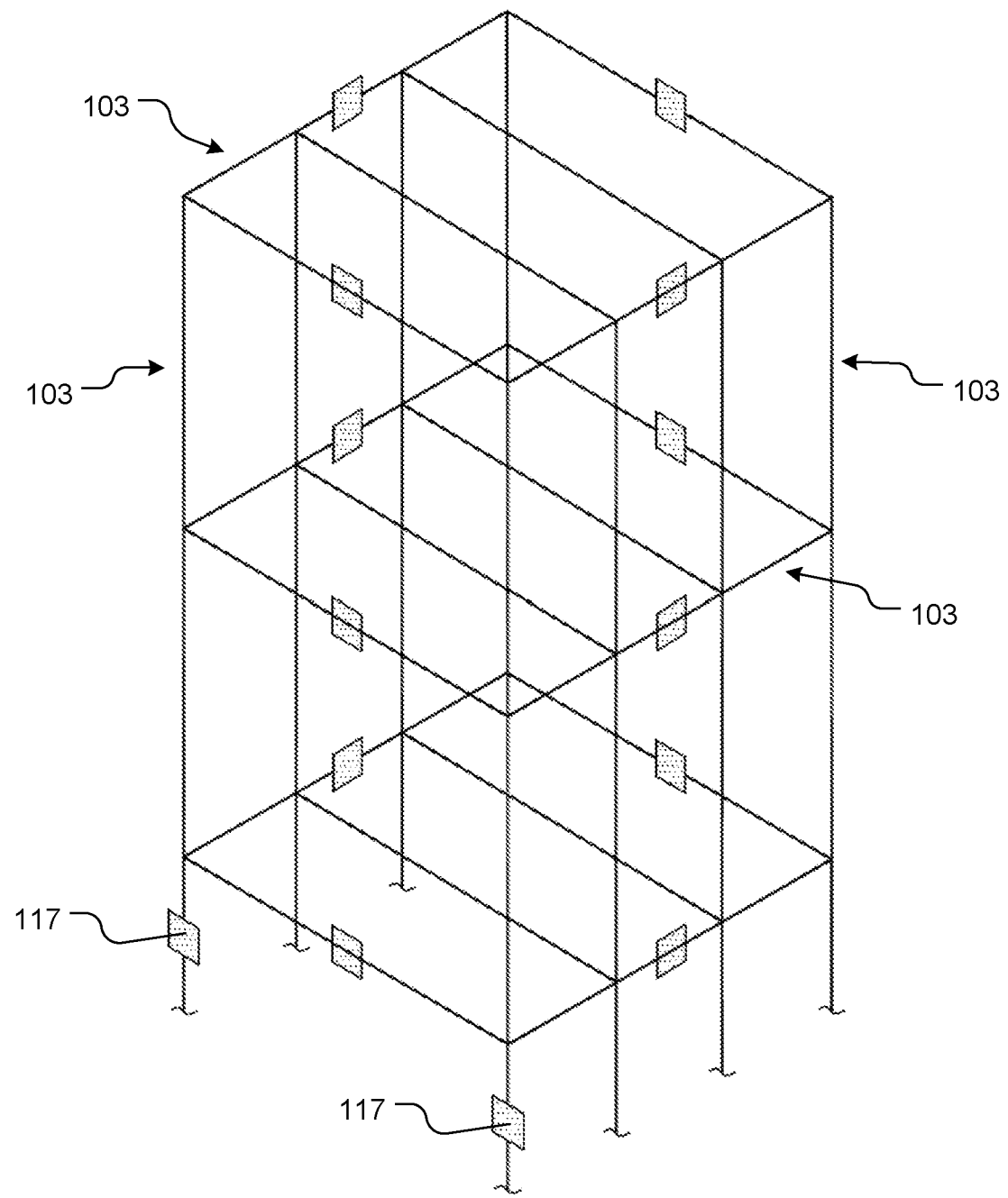
FIG. 3 is a simplified schematic of a delivery network implementing the building shuttle box delivery system.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional freight delivery systems. Specifically, the present invention provides means of transporting cargo within a building both in a vertical and horizontal manner. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a perspective view of a building shuttle box delivery system in accordance with a preferred embodiment of the present application.

In the contemplated embodiment, system 101 includes a plurality of delivery ducts 103 connected in a delivery network throughout a building and having a plurality of junction points 125 for changing directions between horizontal and vertical travel. System 101 includes a plurality of delivery vehicles 105 configured to travel along the delivery ducts 103 in either a horizontal or vertical direction. System 101 further includes a plurality of access ports 117 distributed throughout the delivery network and configured to provide access to the delivery vehicles 105. Each access port 117 may further include a port access door 119 configured to open and close the access port 117.

The junctions may include a plurality of hold devices 107 configured to facilitate directional change for the delivery vehicles 105 while in the junction points 125. The hold devices 107 may be disposed in the corners or along the edges of the delivery ducts 103 at the junction points 125.

The delivery ducts 103 may further include a plurality of movement rails 115 disposed along an inside edge of the delivery ducts 103. The movement rails 115 are contemplated to be produce an electromagnetic field that would surround the delivery vehicles 105 and then cause them to travel along the delivery ducts 103.

Each delivery vehicle 105 further includes a plurality of positional pads 111 and directional pads 113 disposed on an outer surface of the delivery vehicle 105. The positional pads 111 and the directional pads 113 are configured to interact with the movement rails 115 and the delivery ducts 103 to allow the delivery vehicle 105 to travel therein. It is contemplated that the positional pads 111 and the directional pads 113 could produce or modify an electromagnetic field.

The delivery vehicle 105 may also include a plurality of crawler wheel assemblies 121 and at least one fall brake 123 disposed on the outer surface of the delivery vehicle 105.

It should be appreciated that one of the unique features believed characteristic of the present application is that movement rails 115, positional pads 111 and directional pads 113 create and modify electromagnetic fields therebetween to allow the delivery vehicle 105 to move both vertically and horizontally within a building or other structure.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A building shuttle box delivery system, comprising:
   a plurality of delivery ducts forming a delivery network having a plurality of junction points, each of the plurality of deliver ducts having a plurality of rails disposed within an inner cavity formed by the plurality of delivery ducts;
   at least one delivery vehicles configured to travel along the plurality of delivery ducts, the at least one deliver vehicles having:
     a rectangular body having an outer surface;
     a horizontal pad and a vertical pad positioned perpendicular to each other, the horizontal pad and the vertical pad are secured to the outer surface; and
     a wheel assembly, having:
       a vertical wheel and a horizontal wheel positioned perpendicular to the vertical wheel; and
       a brake pad; and
   a plurality of access ports disposed within the delivery network and configured to provide access to the delivery vehicles;
   wherein an electromagnetic force is created between the horizontal pad, the vertical pad and the plurality of rails, which in turn propels the at least one delivery system within the plurality of deliver ducts;
   wherein the vertical wheel and the horizontal wheel comes into contact with an inner surface of the plurality of deliver ducts; and
   wherein the brake pad stops with the at least one delivery vehicle within the plurality of ducts.

2. The building shuttle box delivery system of claim 1, wherein each junction point of the plurality of junction points further includes a plurality of hold devices configured to allow a delivery vehicle to change a direction of travel.

3. The building shuttle box delivery system of claim 1, wherein each delivery vehicle of the plurality of delivery vehicles further includes at least one vehicle access door.

4. The building shuttle box delivery system of claim 1, wherein each access port of the plurality of access ports further includes a port access door.

* * * * *